(12) United States Patent
Terashima et al.

(10) Patent No.: US 7,945,547 B2
(45) Date of Patent: May 17, 2011

(54) COMMUNICATION APPARATUS AND METHOD FOR CONTROLLING COMMUNICATION

(75) Inventors: Yoshiki Terashima, Kawasaki (JP); Keiichi Teramoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 11/608,960

(22) Filed: Dec. 11, 2006

(65) Prior Publication Data

US 2007/0162628 A1 Jul. 12, 2007

(30) Foreign Application Priority Data

Dec. 27, 2005 (JP) ................................. 2005-376255

(51) Int. Cl.
*G06F 17/30* (2006.01)
(52) U.S. Cl. ......................................... 707/705; 463/36
(58) Field of Classification Search .................. 707/705, 707/716, 781, 805, 809, E17.117; 386/200, 386/326, 343; 446/37, 175, 353; 463/37, 463/58, 36
See application file for complete search history.

(56) References Cited

U.S. PATENT DOCUMENTS

| | | | | |
|---|---|---|---|---|
| 5,636,994 A * | 6/1997 | Tong | | 434/308 |
| 6,981,073 B2 * | 12/2005 | Wang et al. | | 710/28 |
| 2005/0091311 A1 * | 4/2005 | Lund et al. | | 709/203 |
| 2005/0175324 A1 * | 8/2005 | Gravina et al. | | 386/125 |
| 2006/0192762 A1 * | 8/2006 | Corrion | | 345/166 |
| 2006/0218189 A1 | 9/2006 | Terashima et al. | | |

FOREIGN PATENT DOCUMENTS

| | | |
|---|---|---|
| JP | 2000-357131 | 12/2000 |
| JP | 2004-341736 | 12/2004 |
| WO | WO 2005/013136 A1 | 10/2005 |

* cited by examiner

*Primary Examiner* — Fred I Ehichioya
(74) *Attorney, Agent, or Firm* — Oblon, Spivak, McClelland, Maier & Neustadt, L.L.P.

(57) ABSTRACT

According to one embodiment, a communication apparatus communicates with both a controller device and a control object device. The communication apparatus includes a first provide section that provides file configuration information conforming to a file system format acceptable to the controller device; a receive section that receives an access request to a file included in the provided file configuration information, from the controller device; a convert section that converts the access request to control command information conforming to a predetermined protocol acceptable to the control object device; and a second provide section that provides the control command information to the control object device.

14 Claims, 15 Drawing Sheets

FIG. 5

```
<html>
...
<script>
var fso = new ActiveXObject ("Scripting.FileSystemObject");
//Detect a data storage device connected to content playing apparatus.
for (i = 0; i <9; i++) {
  if (fso.DriveExists ("dev" + i)) break;                                   ... (1)
}
//Read data from the file status.txt in the storage device represented by dev0.
var rso = fso.OpenTextFile ( "dev0:/ status. txt" , "r" );                  ... (2)
var data = rso.ReadLine();                                                  ... (3)
rso. Close();                                                               ... (4)
//Write data to the file status.txt in the storage device represented by dev0.
var wso = fso. openTextFile ( "dev0:control.txt" , "w" );                   ... (5)
var n = wso. WriteLine ( "dance" );                                         ... (6)
wso. Close();                                                               ... (7)
...
</script>
...
<object type="video" style="top:10px; left:100px;" data="video. mpg"/>
...
</html>
```

FIG. 6

```
<html>
...
<script>
//Read data from the file hoge.txt in the storage device.
var data = readPersistentString ("hoge. txt");
//Write the data "test" to the file hoge.txt in the storage device.
var n = writepersistentString ("hoge. txt", "This is a test");
...
</script>
...
<object type="video" style="top:10px; left:100px;" data="video.mpg"/>
...
</bml>
```

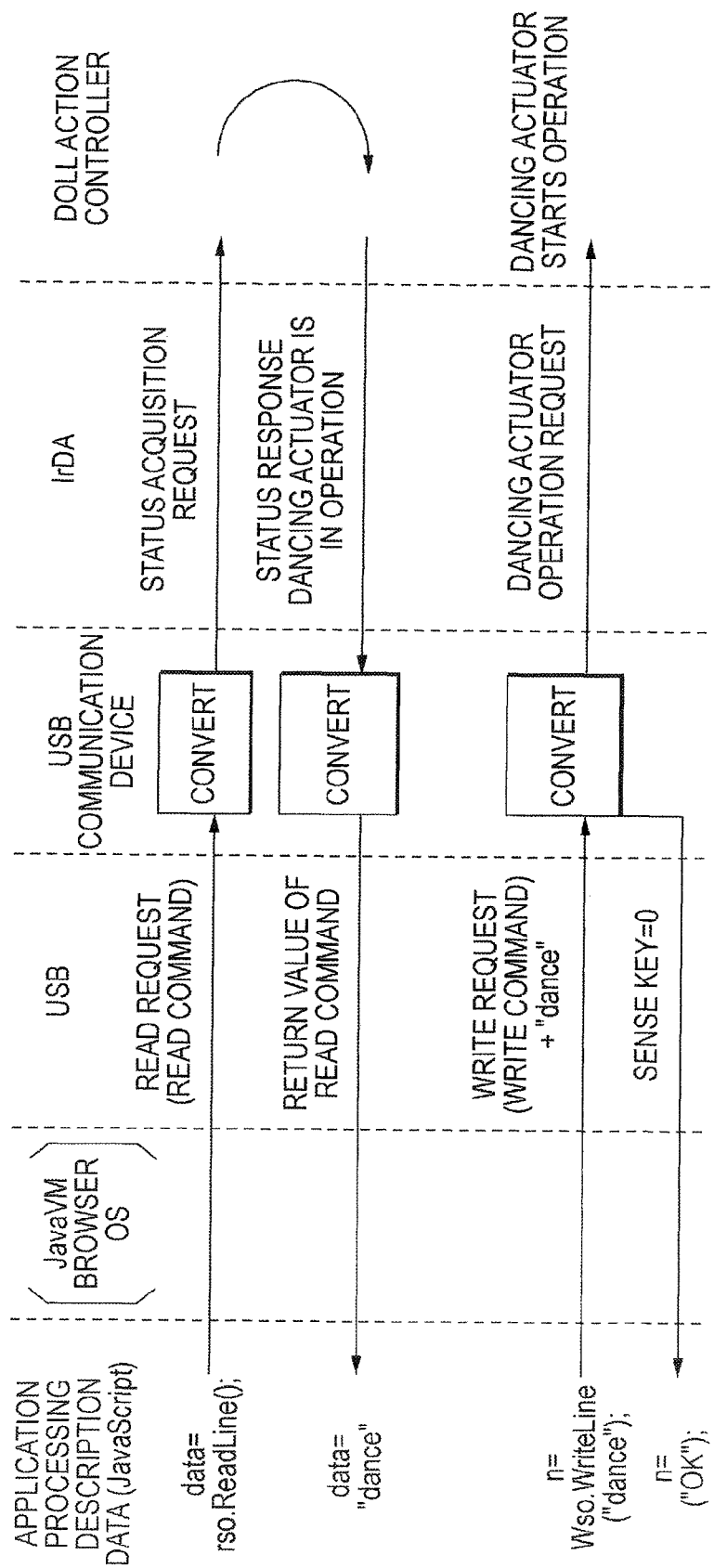

FIG. 8

| USB PROTOCOL | CONVERT DIRECTION | DOLL PROTOCOL |
|---|---|---|
| Read | → | STATUS ACQUISITION REQUEST |
| "dance" | ← | STATUS RESPONSE ("DANCING ACTUATOR IN OPERATION") |
| "talk" | ← | STATUS RESPONSE ("TALKING ACTUATOR IN OPERATION") |
| "stop" | ← | STATUS RESPONSE ("BOTH ACTUATORS ARE IN STOP STATUS") |
| Write ("dance") | → | DANCING ACTUATOR OPERATION REQUEST |
| Write ("talk") | → | TALKING ACTUATOR OPERATION REQUEST |
| Write ("stop") | → | ACTUATOR STOP REQUEST |

COMMUNICATION APPARATUS AND METHOD FOR CONTROLLING COMMUNICATION

CROSS-REFERENCE TO RELATED APPLICATIONS

This application is based upon and claims the benefit of priority from the prior Japanese Patent Application No. 2005-376255, filed on Dec. 27, 2005; the entire contents of which are incorporated herein by reference.

BACKGROUND

1. Field

The present invention relates to a communication apparatus that controls communication between a controller device configured to access a storage device having a file system format and a controlled device externally controllable by using a control protocol.

2. Related Art

Recently, contents are getting more and more varied. Some contents include application-like processing codes rather than simply playing media data such as video and sound. For example, web contents or broadcast contents may include description of application processing by a page description language or a script language, in addition to media data such as video and sound data.

Related art application processing description includes, for example, file read/write from/to a storage device attached to a content playing apparatus for executing the processing.

There are emerging needs to control recently evolving home network devices such as white goods, AV devices or toys equipped with a network interface. More specifically, it may be needed that content for displaying a winter scene while engaging a network-ready air conditioner to decrease the room temperature.

Several mechanisms have been proposed to provide such a "content operating in coordination with a network device".

For example, JP-A 2004-341736 (KOKAI) proposes a mechanism where a description language called SMIL (Synchronized Multimedia Integration Language) is partially extended to describe coordinated operation between media such as video and a network device in order to control the device on a content playing apparatus in accordance with the description.

SUMMARY

According to JP-A-2004-341736 (KOKAI), all network devices and content playing apparatus under control are equipped with communication functions that use common control protocols such as Jini®.

However, there are various combinations of a control protocol and a target product, for example UPnP™ and associated AV devices, ECHONET™ and associated white goods, and a unique protocol and associated toys. New control protocol can emerge in future.

That is, the technology according to JP-A 2004-341736 (KOKAI) is lacking in general versatility.

According to an aspect of the present invention, there is provided a communication apparatus communicates with both a controller device and a control object device. The communication apparatus includes: a first provide section that provides file configuration information conforming to a file system format acceptable to the controller device; a receive section that receives an access request to a file included in the provided file configuration information, from the controller device; a convert section that converts the access request to control command information conforming to a predetermined protocol acceptable to the control object device; and a second provide section that provides the control command information to the control object device.

According to the above configuration, it may be possible to control various functions of a network device by using a storage operation function generally included in a content playing apparatus. As a result, it may be possible to provide a "content operating in coordination with a network device".

BRIEF DESCRIPTION OF THE DRAWINGS

FIG. 5 shows an example of description of application processing description data according to the first embodiment in HTML and JavaScript®.

FIG. 6 shows an example of description of application processing description data according to the first embodiment in BML and ECMAScript.

FIG. 7 shows a relationship between the application processing description data, and command and values communicated by devices according to the first embodiment.

FIG. 8 is a table showing conversion rules of a protocol converter of the USB communication device according to the first embodiment.

DETAILED DESCRIPTION

First Embodiment

Figure 1:
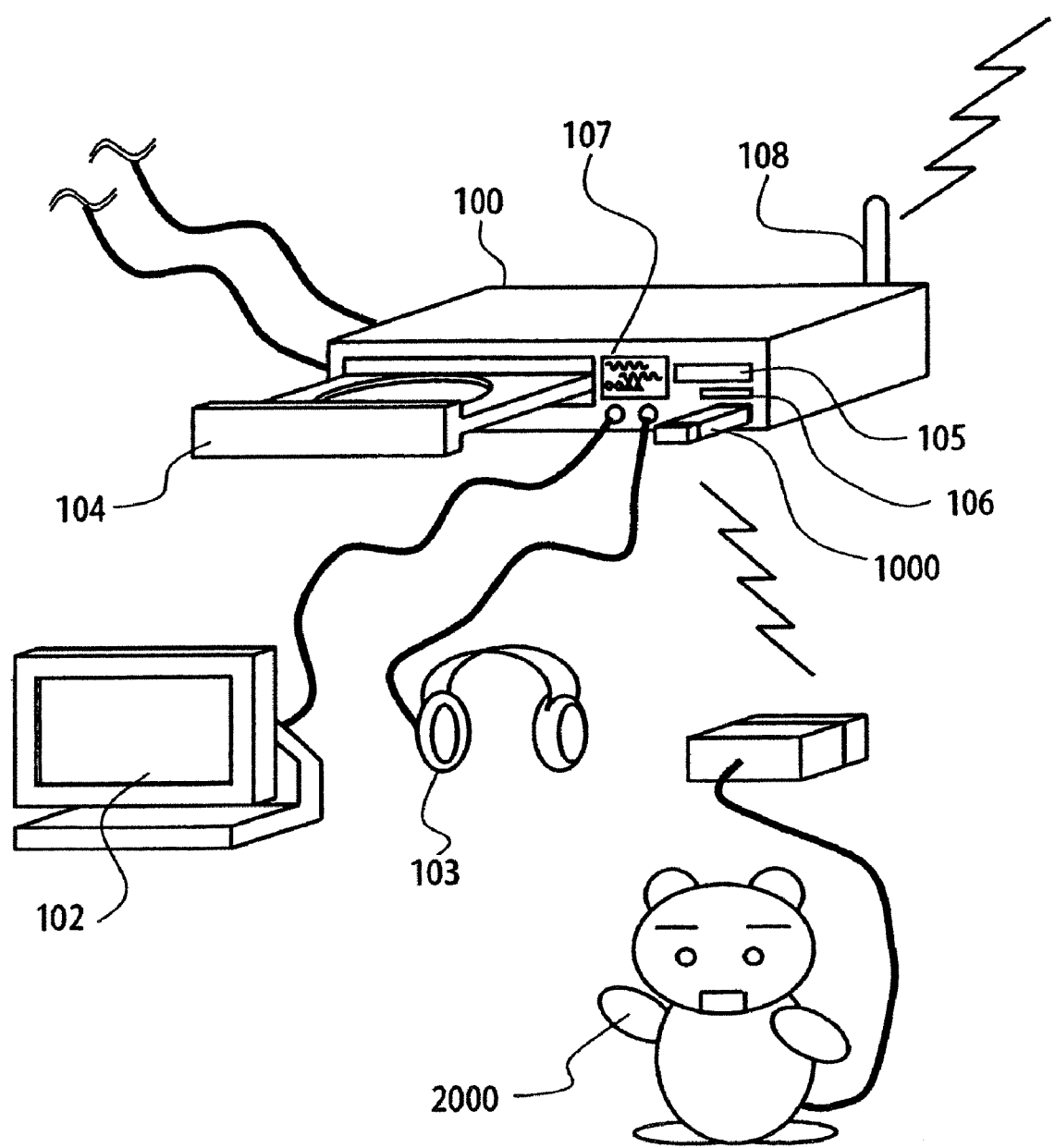
FIG. 1 is a conceptual drawing of a system configuration according to a first embodiment.

A content playing apparatus 100 as shown in FIG. 1 includes, for example, a broadcast decoder to connect to a broadcast wave antenna, a wired network IF (interface) 109 to connect to the Internet, and a wireless network IF 108 to connect to a wireless network. Through these components, the content playing apparatus 100 acquires content information described later, including a broadcast content provided via broadcast wave and a web content provided via the Internet.

The content playing apparatus 100 further includes a media drive such as a DVD drive 104 and a memory card slot 105 and an external device IF such as a USBIF 106. The content playing apparatus 100 acquires a desired content from a corresponding removable medium.

The content playing apparatus 100 plays the acquired content in accordance with the instruction of the user input from a control panel 107. The user selects on the control panel 107 from which content source (broadcast decoder, wired/wireless network IF, media drive or external device IF) the target content to be played is acquired.

The played content is transmitted to a playing device such as a display 102 or a headphone 103 and delivered to the user.

A USB communication device 1000 as a control device is connected to the USBIF.

The USB communication device 1000 which is recognized as a removable medium by the content playing apparatus 100 accepts a write or read command for a storage device. The USB communication device 1000 performs infrared communication with a doll 2000 in accordance with the IrDA standard. The USB communication device 1000 converts a command for the storage device received from the content playing apparatus 100 to a control command for the doll 2000 and transmits the control command to the doll 2000. The USB communication device 1000 receives data from the doll 2000 and stores the data to the content playing apparatus 100 as a file in a removable disc.

The doll 2000 as a network device performs infrared communication with the USB communication device 1000. The doll 2000 moves in accordance with the action request received from the USB communication device 1000 and transmits a status of the doll when receiving a status acquisition request.

Content information in this embodiment includes not only media data representing video and sound as generally discussed in the related art but also application processing description data mentioned later.

The application processing description data is described in a script language such as Macromedia Flash® format (SWF format), JavaScript® format, or ECMAScript format. As found in recent web contents and broadcast contents, the application processing description data is provided while embedded in a file described in a markup language in the HTML (Hyper Text Markup language) or BML (Broadcast Markup Language) format.

The application processing description data includes a command intended to acquire the status of the doll 2000 for example as a read command to read data from a storage device.

The application processing description data also includes a command intended to request an action of the doll 2000 as a write command to write data to a storage device.

Figure 2:
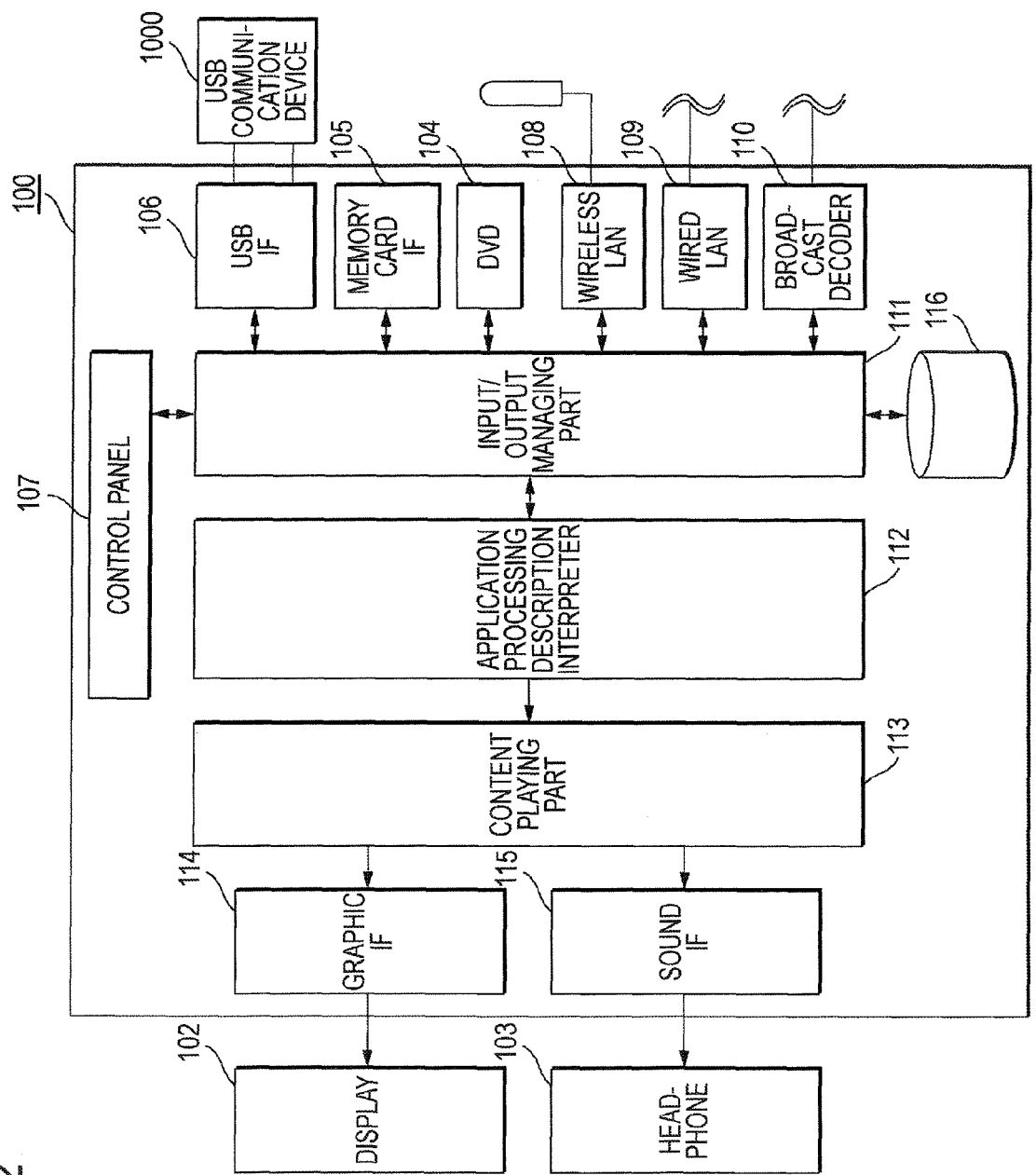
FIG. 2 is a block diagram of a content playing apparatus according to the first embodiment.

The content playing apparatus 100 as shown in FIG. 2 includes: a DVD drive 104; a memory card slot 105; a USBIF 106; a control panel 107; a wireless network IF 108; a wired network IF 109; a broadcast decoder 110; an external input/output managing part 111; an application processing description interpreter 112; a content playing part 113; a graphic IF 114; a sound IF 115; and an HDD (hard disc drive) 116.

The DVD drive 104 acquires content information from a DVD.

The memory card slot 105 acquires content information from a memory card that is inserted.

The USBIF 106 is an interface that has a USB host function and connects to other devices having a USB peripheral function. The USBIF 106 is able to read/write data while connected to for example a storage peripheral conforming to the USB mass storage class. Note that the USBIF 106 is not limited to a host according to the USB On-The-Go function specified in USB 2.0.

The wireless network IF 108 is for example an interface conforming to the wireless LAN specified by IEEE802.11. The wireless network IF 108 acquires content information through a wireless network.

The wired network IF 109 is for example an interface conforming to the wired LAN specified by IEEE802.3. The wired network IF 109 acquires content information through a wired network.

The broadcast decoder 110 is for example a receiving device conforming to the digital broadcast standard defined by the ARIB STD. The broadcast decoder 110 acquires content information by decoding broadcast wave.

The HDD 116 is a storage device accommodated in the content playing apparatus 100 and stores part of the information used by the processing in the application processing description interpreter 112 or content playing part 113.

The control panel 107 accepts the user's content source selection instruction.

The external input/output managing part 111 controls data read/write operations from/to the DVD drive 104, the memory card slot 105, the USBIF 106, the control panel 107, the wireless network IF 108, the wired network IF 109, the broadcast decoder 110 and the HDD 116.

The application processing description interpreter 112 extracts application processing description data from content information and interprets the extracted data. The function of the application processing description interpreter 112 can be implemented for example on an operating system (OS) or JavaScript® interpreter in case JavaScript® is used as the script language.

The OS including the application processing description interpreter 112 supports USB and accesses a file in the USB communication device 1000 in accordance with the file system of the OS.

A file access command described in content information includes, for example, a drive identifier and the identifier of a file stored in the drive, or may include description to be written into the file. The application processing description interpreter 112 accesses a data file that is virtually stored in a device conforming to the USB mass storage class to connect to the USBIF 106 through the external input/output managing part 111 and the USBIF 106 in accordance with the file access command. The application processing description interpreter 112 extracts media data from the content information and outputs the extracted media data to the content playing part 113.

The content playing part 113 decodes the media data, generates a video signal and outputs the video signal to the display 102 through the graphic IF 114. The content playing part 113 decodes the media data, generates a sound signal and outputs the sound signal to the headphone 103 through the sound IF 115.

Figure 3:
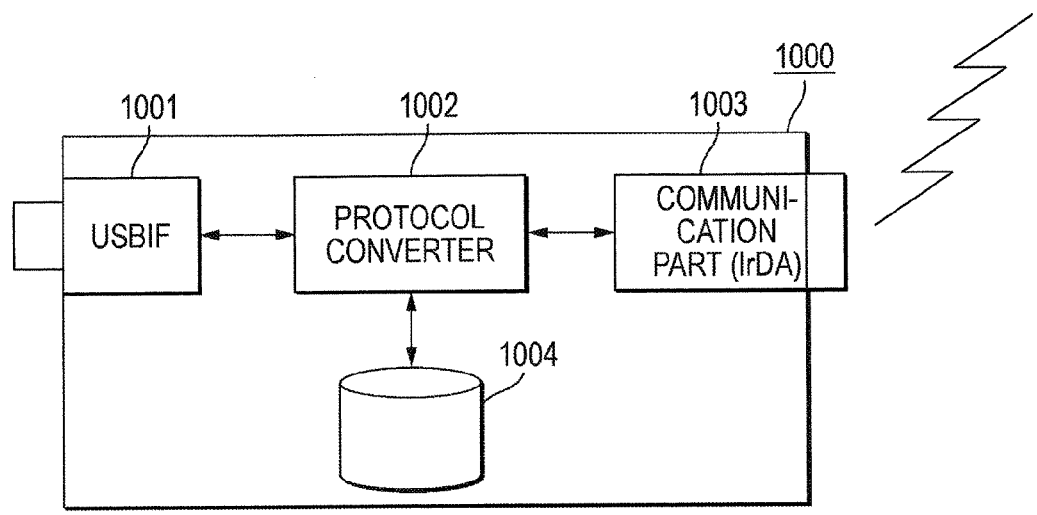
FIG. 3 is block diagram of a USB communication device according to the first embodiment.

The USB communication device 1000 as shown in FIG. 3 includes: a USBIF 1001; a protocol converter 1002; a communication part 1003; and a storage part 1004.

The USBIF 1001 that acts as a storage peripheral conforming to the USB mass storage class communicates data with an external USB host device. In this embodiment, the external USB host device is the content playing apparatus 100. The USBIF 1001 outputs data received over the communication by using a protocol to communicate with a storage device, such as the ATA system and the SCSI system. The USBIF 1001 acquires data to transmit over the communication with the external USB host device by using the protocol to communicate with a storage device. That is, the USBIF 1001 may be a conventional IF conforming to the USB mass storage class.

The protocol converter 1002 communicates with the USBIF 1001 by using the protocol to communicate with the storage device. Operation of the protocol converter 1002 according to the first embodiment may be implemented as hardware such as ASIC (Application SpecIFic Integrated Circuit) or FPGA (Field Programmable Gate Array).

The protocol converter 1002 writes the data received over the communication on the storage part 1004. The protocol converter 1002 converts the data received over the communication to action control data for controlling the action of the doll 2000 and transmits the data to the communication part 1003. The protocol converter 1002 converts the data received from the communication part 1003, transmits the converted data to the USBIF 1001 by using the protocol to communicate with the storage device, and writes the data on the storage part 1004.

For the USBIF 1001, the protocol converter 1002 according to the first embodiment is recognized as storage device storing a text file "status.txt" having read-only attribute and a text file "control.txt" having writable attribute. The text files "status.txt" and "control.txt" conform to a file system format supported by the OS of the content playing apparatus 100. That is, a fixed return value is sent back as an address for the file system of the OS to acquire file/folder configuration in the drive. This is implemented for example using a LUT (lookup table). The protocol converter 1002 rejects a command to add a new file other than the two files. The protocol converter 1002 rejects a change to the attributes of the two files.

The communication part 1003 performs infrared communication with the doll 2000 in accordance with the IrDA® standard, for example.

Figure 4:
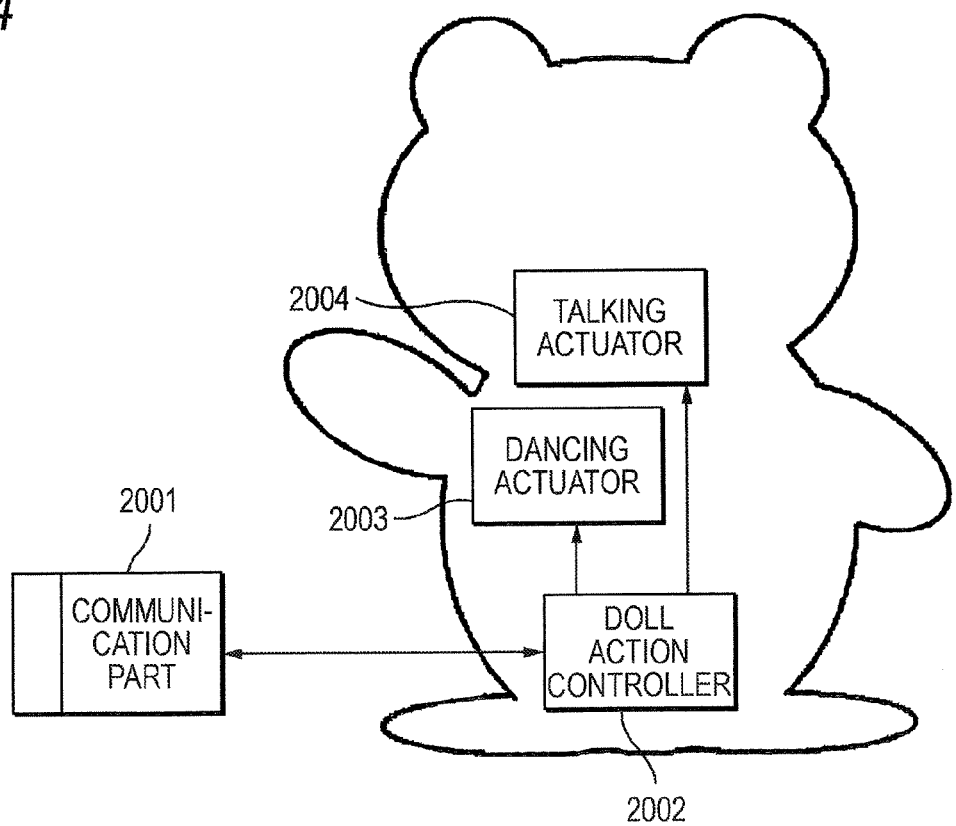
FIG. 4 is a block diagram of a doll according to the first embodiment.

The doll 2000 as shown in FIG. 4 includes: a communication part 2001; a doll action controller 2002; a dancing actuator 2003; and a talking actuator 2004.

The communication part 2001 performs infrared communication with the communication part 1003 of the USB communication device 1000 in accordance with the IrDA standard, for example.

Operation of the dancing actuator 2003 and the talking actuator 2004 is controlled by the doll action controller 2002. The dancing actuator 2003 is attached to the doll 2000 so that the doll 2000 seems to be dancing. The talking actuator 2004 is attached to the doll 2000 so that the doll 2000 seems to be talking.

The doll action controller 2002 returns the status of each of the dancing actuator 2003 and the talking actuator 2004 or controls the action of each actuator based on the data transmitted from the communication part 2001.

To be more specific, when the data transmitted from the communication part 2001 indicates a status acquisition request, the doll action controller 2002 returns a status response indicating whether the dancing actuator 2003 and the talking actuator 2004 are in operation or stopped.

When the data transmitted from the communication part 2001 indicates an action request of the dancing actuator 2003, the doll action controller 2002 causes the dancing actuator 2003 to operate.

When the data transmitted from the communication part 2001 indicates an action request of the talking actuator 2004, the doll action controller 2002 causes talking actuator 2004 to operate.

When the data transmitted from the communication part 2001 indicates a stop request, the doll action controller 2002 stops the operation of the dancing actuator 2003 and the talking actuator 2004.

An example of application processing description data in the system of the first embodiment thus configured will be described referring to FIGS. 5 and 6.

FIG. 5 shows an example of description of application processing description data in HTML and JavaScript®. FIG. 6 shows an example of description of application processing description data in BML and ECMAScript.

JavaScript® and ECMAScript each has a function to access the file system of the content playing apparatus 100 although there are minor differences such as a function name and an argument. An existing DVD displays a chapter selection menu or a played language setting menu when the DVD is played. This assumes that an application processing description mechanism operating in coordination with the screen display is provided.

For example, DriveExists( ) in FIG. 5 is a function to detect a storage device in the file system of the content playing apparatus 100. ReadLine( ) is a function to read a single-line text from a file opened for the purpose of reading and assign the text to the variable of the left part. WriteLine( ) is a function to write data within ( ) to a file opened for the purpose of writing.

For example, readPersistentString( ) is a function to assign data read from a file written in ( ) to the variable of the left part. writePersistString( ) is a function to write to a file of the name described in ( ) the data described on the same place.

FIG. 7 shows the relationship between the application processing description data, and command and values communicated by the devices shown in FIG. 5. In this example, the USB communication device 1000 is recognized as the first-order drive by the application processing description interpreter 112.

In FIG. 5, the lines (1) to (4) attempts to acquire the action status of the doll 2000.

The file "status.text" stored in a drive represented by the variable fso detected in the line (1) is opened with the read attribute in the line (2). The opened file is represented by the variable rso. In the line (3), the value of a single line read from the file is stored into the variable "data".

"vardata=rso.ReadLine( )" in the line (3) as a read request to the file represented by the variable rso is converted to a read request to the USB communication device 1000 by the JavaScript® interpreter or the OS. The read request to the USB communication device 1000 is a read request (READ command) to a peripheral from the host in the so-called USB mass storage class.

Receiving the READ command in the USB mass storage class, the protocol converter 1002 of the USB communication device 1000 converts the READ command to a status acquisition request to the doll action controller 2002 of the doll 2000.

Receiving the status acquisition request, the doll action controller 2002 of the doll 2000 returns a status response such as that the dancing actuator 2003 is in operation, the talking actuator 2004 is in operation, or both actuators are in stop status.

The status response is converted to a return value of the READ command by the protocol converter 1002 of the USB communication device 1000. The return value is single-line text data as a value read from the file "status.txt". When the status response is a value indicating that the dancing actuator 2003 is in operation, the text "dance" is returned as a return value of the READ command. When the status response is a value indicating that the talking actuator 2004 is in operation, the text "talk" is returned as a return value of the READ command. When the status response is a value indicating that both actuators are in stop status, the text "stop" is returned.

The single-line text data as the return value of the READ command is stored into the variable "data".

In the line (4), the file represented by the variable rso is closed as the operation to close the file "status.txt".

In the subsequent lines (5) to (7), a command to operate the doll 200 is described.

The file "control.txt" stored in the drive represented by the variable fso is opened with the write attribute in the line (5). The opened file is represented by the variable wso. A single text line "dance" corresponding to the action to be taken by the doll 2000 is written in the file. The success or failure of the write operation is stored into the variable n.

"var n=wso.WriteLine("dance")" as a write request to a file represented by the variable wso is converted to a write request to the USB communication device 1000 by the JavaScript® interpreter or the OS. The write request to the USB communication device 1000 is a write request (WRITE command) to a peripheral by a host in the so-called USB mass storage class and a logical block representing "dance" to be sent subsequently.

Receiving the WRITE command in the USB mass storage class and the text "dance", the protocol converter 1002 of the USB communication device 1000 converts the WRITE command and the text "dance" to a dancing actuator operation request to the doll action controller 2002 of the doll 2000.

When the conversion is successful, the protocol converter 1002 of the USB communication device 1000 returns a value (that is, 0 as a value of SENSE KEY) indicating that writing is successful in the USB mass storage class to the content playing apparatus 100.

Receiving the dancing actuator operation request, the doll action controller 2002 of the doll 2000 causes the dancing actuator 2003 to operate.

When the text to write using WriteLine( ) in the line (6) is "talk", the protocol converter 1002 of the USB communication device 1000 that has received the WRITE command in the USB mass storage class and the text "talk" converts the WRITE command and the text "talk" to a talking actuator operation request to the doll action controller 2002 of the doll 2000.

When the text to write using WriteLine( ) in the line (6) is "stop", the protocol converter 1002 of the USB communication device 1000 that has received the WRITE command in the USB mass storage class and the text "stop" converts the WRITE command and the text "stop" to an actuator stop request to the doll action controller 2002 of the doll 2000.

FIG. 8 is a table showing the conversion rules of the protocol converter 1002 of the USB communication device 1000.

The left column of the table shows input/output data to/from the USBIF 1001. The right column of the table shows input/output data to/from the communication part 1003.

A READ command input from the USBIF 1001 is converted to a status acquisition request output from the communication part 1003. A WRITE command input from the USBIF 1001 is converted to various data by the subsequent write data. That is, when the write data following the WRITE command is "dance", the command is converted to a dancing actuator operation request. When the write data following a WRITE command is "talk", the command is converted to a talking actuator operation request. When the write data following the WRITE command is "stop", the command is converted to an actuator stop request.

When the status response input from the communication part 1003 is a value indicating that the dancing actuator is in operation, the data returned to the content playing apparatus 100 by the USBIF 1001 is "dance". When the status response is a value indicating that the talking actuator is in operation, the data returned to the content playing apparatus 100 by the USBIF 1001 is "talk". When the status response is a value indicating that both actuators are in stop status, the data returned to the content playing apparatus 100 by the USBIF 1001 is "stop".

This conversion rule is stored in the protocol converter 1002 in the form of a conversion table, for example.

When an input not defined in the conversion rule is made from the USBIF 1001, a value indicating that the input is rejected (that is, 8 as a value of SENSE KEY) to the USBIF 1001.

Operation of the system according to the first embodiment having the above configuration will be described referring to FIGS. 9, 10, 11 and 12.

Figure 9:
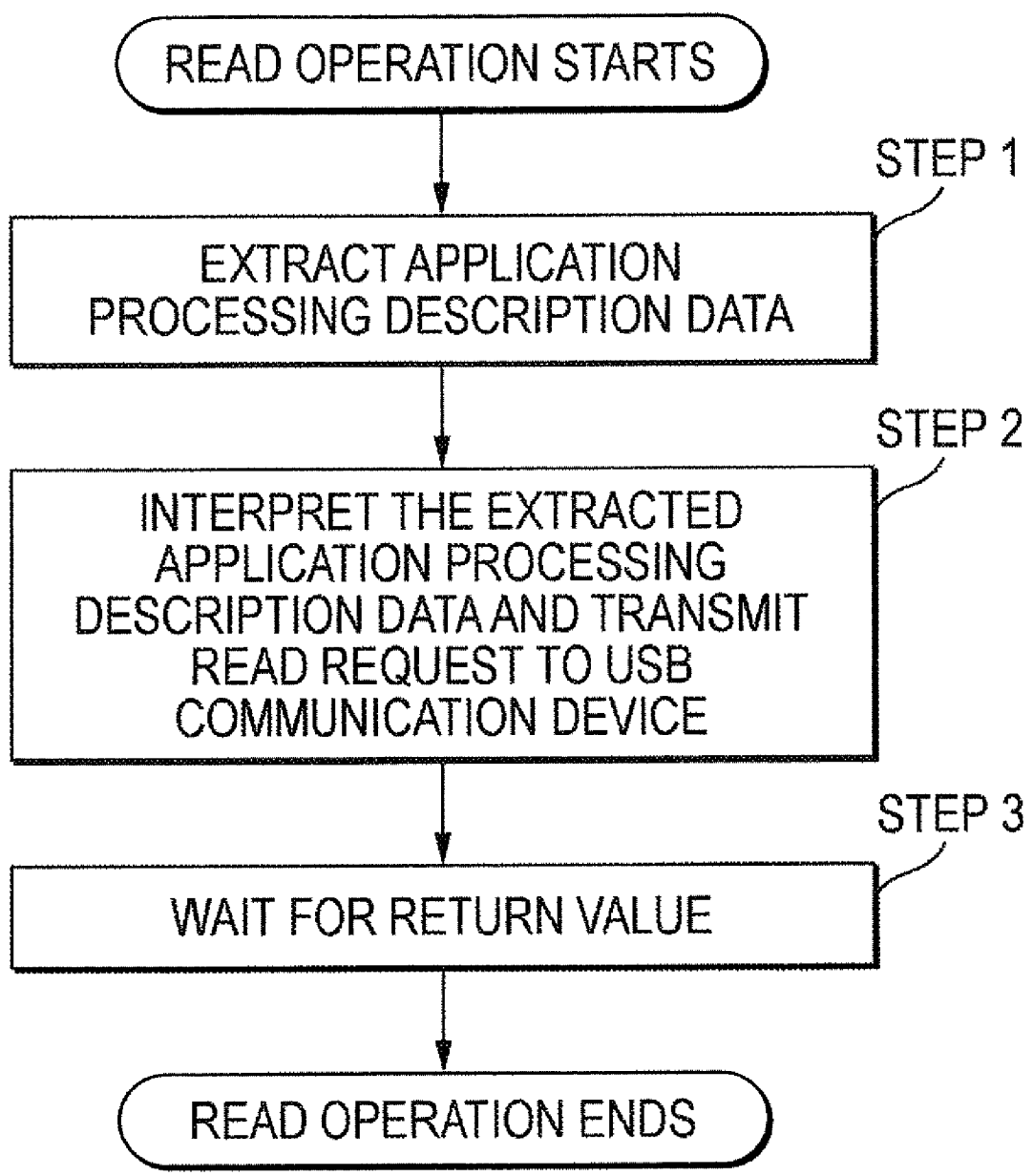
FIG. 9 is a flowchart showing a read operation of the content playing apparatus according to the first embodiment.

FIG. 9 is a flowchart showing the read operation of the content playing apparatus 100 in FIGS. 5 and 7.

The application processing description interpreter 112 acquires content information from a content source and extracts therefrom application processing description data (Step 1).

Next, the application processing description interpreter 112 interprets ReadLine( ) described in the extracted application processing description data, transmits a read request to the USB communication device 1000 (Step 2), and waits for a return value (Step 3).

While the codes in FIG. 5 shows the above exemplary description, a code may be added that converts the return value to character graphic data, transmits the data to the content playing part 113 and cause the data to be displayed on the display 102.

Figure 10:
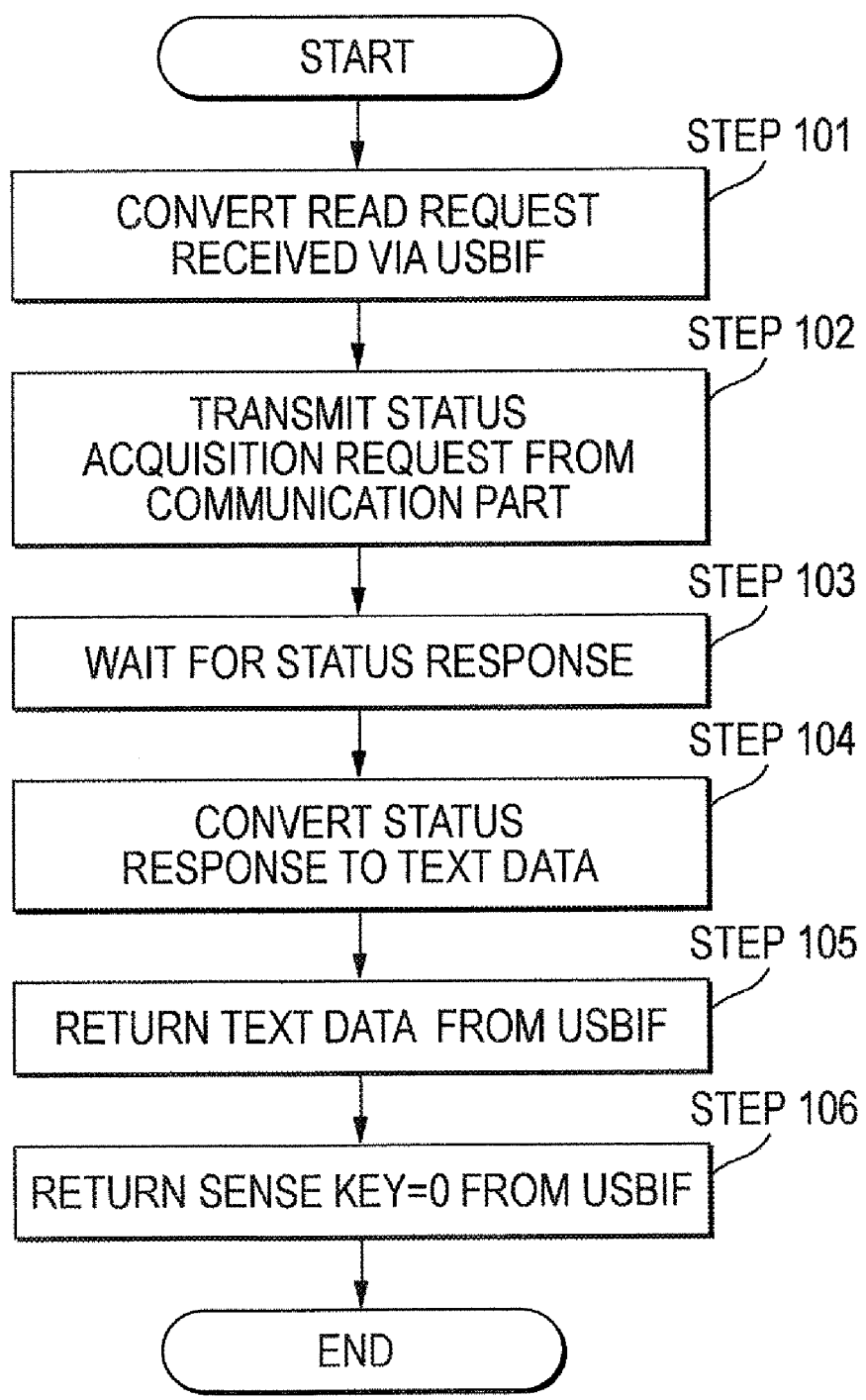
FIG. 10 is a flowchart showing an operation of the USB communication device according to the first embodiment.

FIG. 10 is a flowchart showing the operation of the USB communication device 1000 with respect to the content playing apparatus 100 in FIG. 9.

Receiving a read request from the content playing apparatus 100, the protocol converter 1002 of the USB communication device 1000 converts the read request to a status acquisition request to the doll action controller 2002 of the doll 2000 (Step 101).

Next, the communication part 1003 of the USB communication device 1000 transmits the status acquisition request (Step 102) and waits for a status response (Step 103).

The protocol converter 1002 converts the status response received by the communication part 1003 to single-line data as a return value of a READ command read from the file "status.txt".

When the status response is a value indicating that the dancing actuator 2003 is in operation, the text "dance" is returned as a return value of the READ command. In case the status response is a value indicating that the talking actuator 2004 is in operation, the text "talk" is returned as a return value of the READ command. When the status response is a value indicating that both actuators are in stop status, the text "stop" is returned (Step 105).

When the conversion is successful, the protocol converter 1002 of the USB communication device 1000 returns a value (that is, 0 as a value of SENSE KEY) indicating that writing is successful as the USB mass storage class to the content playing apparatus 100 (Step 106).

Figure 11:
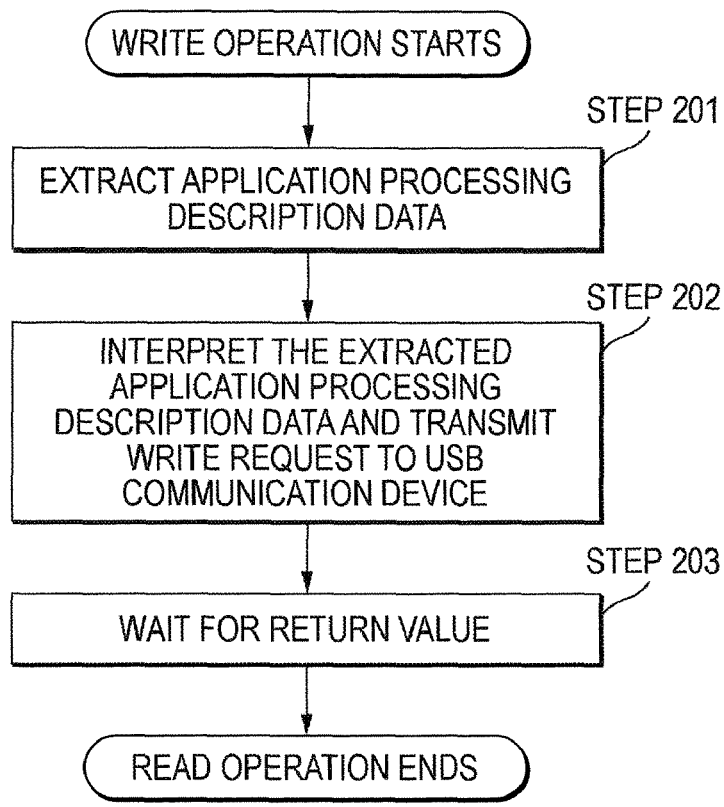
FIG. 11 is a flowchart showing a write operation of the content playing apparatus according to the first embodiment.

FIG. 11 is a flowchart showing the write operation of the content playing apparatus 100 in FIGS. 5 and 7.

The content playing apparatus 100 acquires content information from a content source and extracts application processing description data from the content information (Step 201).

Next, the application processing description interpreter 112 of the content playing apparatus 100 interprets WriteLine ( ) described in the extracted application processing description data, transmits a write request of the text "dance" to the USB communication device 1000 (Step 202), and waits for a return value (Step 203).

Figure 12:
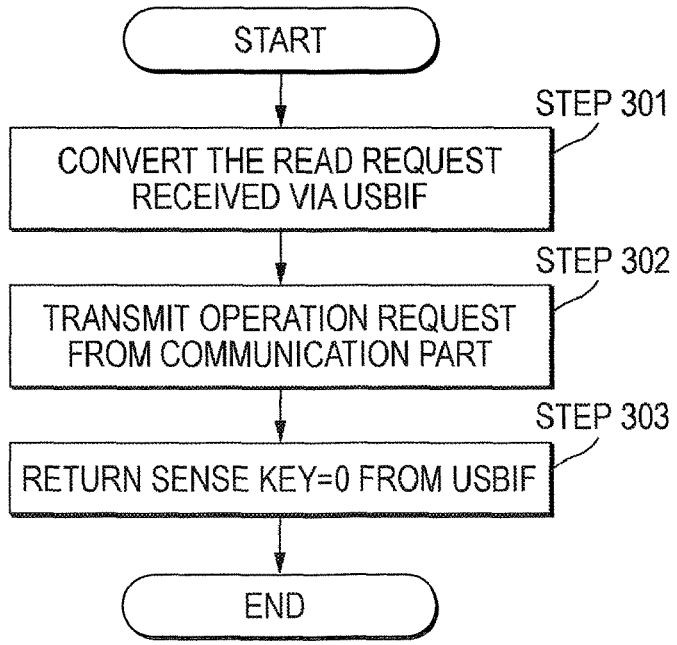
FIG. 12 is a flowchart showing an operation of the USB communication device according to the first embodiment.

FIG. 12 is a flowchart showing the operation of the USB communication device 1000 with respect to the content playing apparatus 100 in FIG. 11.

Receiving a read request for the text "dance" from the content playing apparatus 100, the protocol converter 1002 of the USB communication device 1000 converts the read request to a dancing actuator operation request to the doll action controller 2002 of the doll 2000 (Step 301).

When the conversion is successful, the protocol converter 1002 returns a value (that is, 0 as a value of SENSE KEY) indicating that writing is successful as the USB mass storage class to the content playing apparatus 100 (Step 302).

Next, the communication part 1003 of the USB communication device 1000 transmits a dancing actuator operation request (Step 303).

The attribute of the control.txt may be a writable/readable attribute and the description of the status.txt may be returned as a return value in response to reading of the control.txt.

A command to turn ON the power of the doll 2000 when a file is opened may be transmitted to the doll 2000 and the power of the doll 2000 may be turned ON accordingly. A command to turn OFF the power of the doll 2000 when a file is closed may be transmitted to the doll 2000 and the power of the doll 2000 may be turned OFF accordingly.

The protocol converter 1002 may be provided as software. In this case, what is needed as hardware is a PC board or an equivalent capable of including the USBIF 1001 and the communication part 1003 as external communication interfaces that can execute the software. By passing the communication over the USBIF 1001 to an application providing the operation of the protocol converter 1002 through a file service protocol such as an SMB (Server Message Block) or an NFS (Network File System), it is possible to design the protocol converter 1002 without being limited by the file system of the content playing apparatus 100.

Second Embodiment

Figure 13:
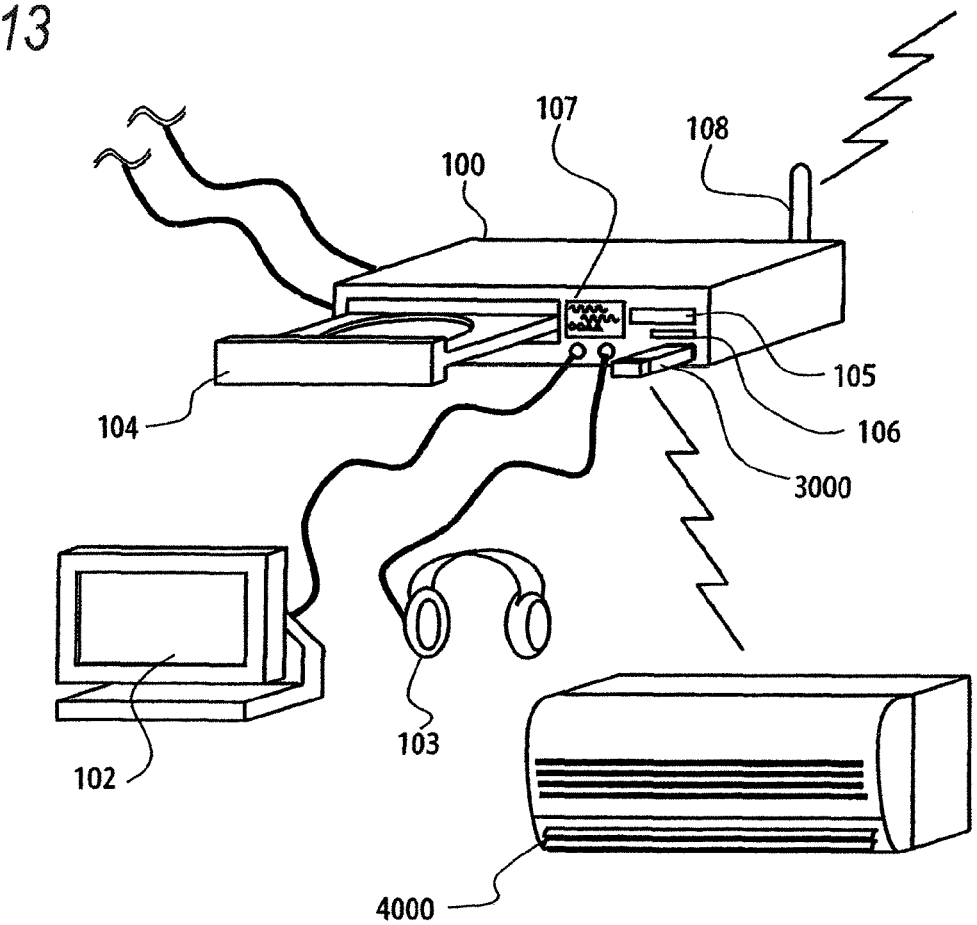
FIG. 13 is a conceptual drawing of a system configuration according to a second embodiment.

The USB communication device 3000 as shown in FIG. 13 which is recognized as a removable medium by the content playing apparatus 100 accepts a write or read command for a storage device. The USB communication device 3000 wirelessly communicates with an air conditioner 4000 based on for example Bluetooth® standard. The USB communication device 3000 converts a command for a storage device received from the content playing apparatus 100 to a control command for the air conditioner 4000 and transmits the resulting command to the air conditioner 4000. The USB communication device 3000 receives data from the air conditioner 4000 and provides the data to the content playing apparatus 100 as a file in a removable disc.

The air conditioner 4000 conforms to ECHONET™. Operation of the air conditioner 4000 is turned ON or OFF based on a command from a controller via Bluetooth®communication. The operation status of the air conditioner 4000 may be transmitted to the controller for notification purpose. In this embodiment, the controller includes a content playing apparatus 1000 and a USB communication device 3000.

Application processing description data in the content information according to the second embodiment includes a command to an ECHONET™ application. The command to an ECHONET™, application described below is assumed to include an EOJ (ECHONET™ object: identifier of a controlled device), an EPC (ECHONET™ property code: identifier representing the controlled feature of the controlled device) and an EDT (ECHONET™ data: value to set to the controlled feature).

Figure 14:
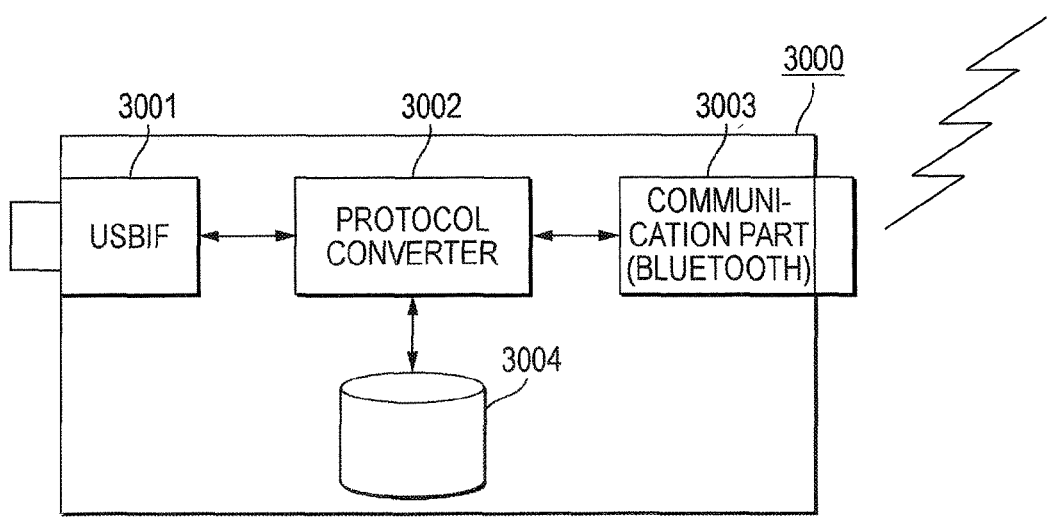
FIG. 14 is a block diagram of a USB communication device according to the second embodiment.

The USB communication device 3000 as shown in FIG. 14 includes: an USBIF 3001; a protocol converter 3002; a communication part 3003; and a storage part 3004.

The USBIF 3001 that acts as a storage peripheral conforming to the USB mass storage class communicates data with an external USB host device. In the second embodiment, the external host device is the content playing apparatus 100.

The protocol converter 3002 executes ECHONET™ communication middleware and service middleware as well as higher-rank application software. The protocol converter 3002 includes a storage part 3012 for storing information generated by the operation of the protocol converter 3002. The communication part 3003 performs Bluetooth® communication with the air conditioner 4000.

Operation of the USB communication device 3000 according to this embodiment will be described separately in terms of a USB connection phase, an event supervision phase, and a command execution phase.

Figure 15:
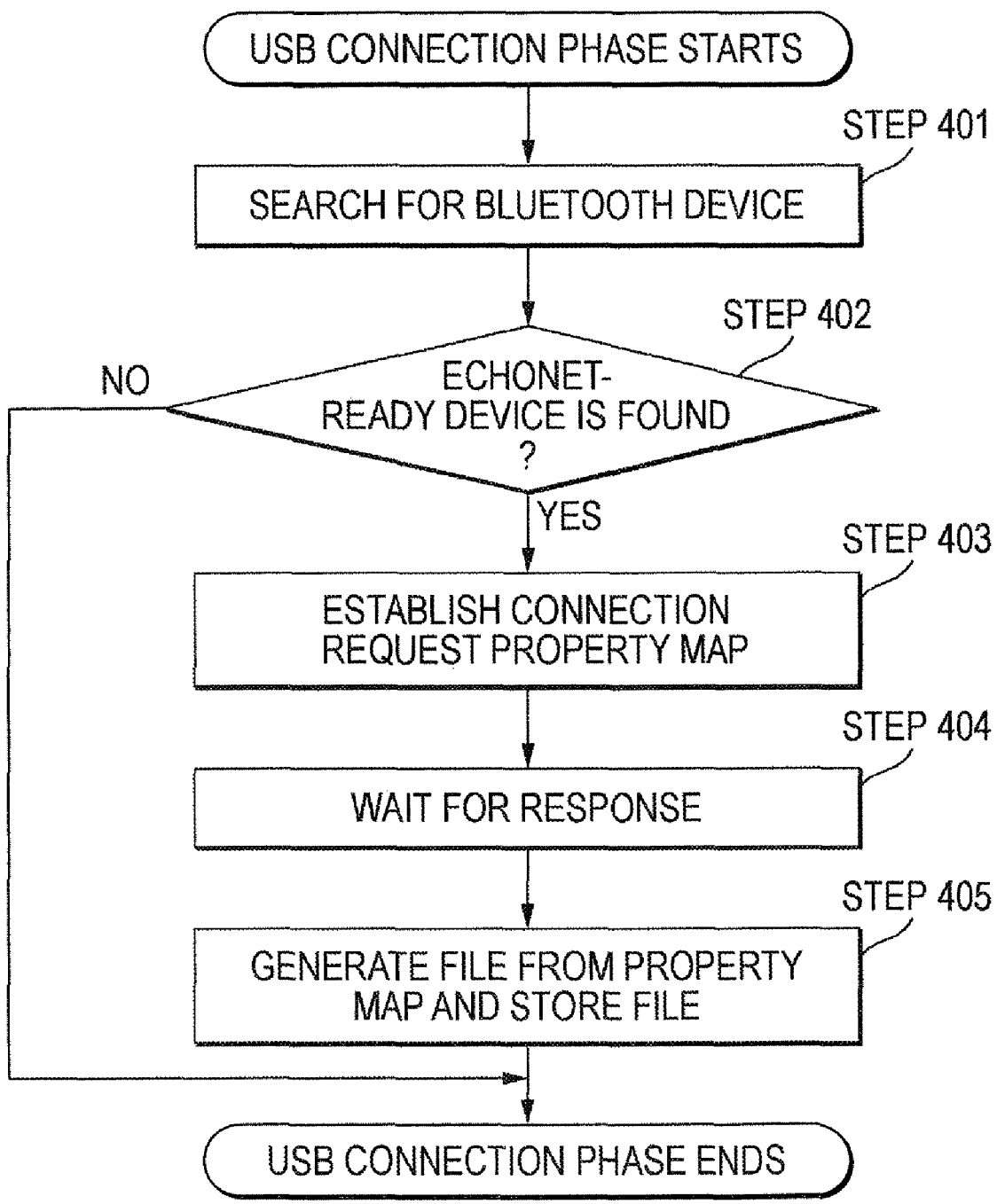
FIG. 15 is a flowchart showing an operation of the USB communication device at a USB connection phase according to the second embodiment.

FIG. 15 is a flowchart showing the operation of the USB communication device 3000 at the USB connection phase.

Recognizing that the USBIF 3001 has connected to a USB host device, the protocol converter 3002 searches for a Bluetooth®-ready device that may be communicated with through the communication part 3003 (Step 401).

Next, when the found Bluetooth®-ready device conforms to ECHONET™ (Yes in Step 402), the protocol converter 3002 establishes a Bluetooth® connection, transmits a property map request to a distant party in Bluetooth® communication through the communication part 3003 (Step 403), and waits for a response (Step 404). Here the property map is a list of commands that an ECHONET™ device can accept. When the found Bluetooth®-ready device does not conform to ECHONET™ (No in Step 402), the protocol converter 3002 finishes the phase without establishing a connection with the found device.

Receiving the property map, the protocol converter 3002 makes a text file having an attribute based on an access rule and the storage part 3012 stores the text file (Step 405). The text file has a name based on the EOJ, the EPC and the access rule.

In the second embodiment, the file name is represented as "/(EOJ)/(EPC)/(access rule).txt" where "/" represents a hierarchy of folders. These files are managed in separate folders per EOJ, EPC and the access rule. When the EOJ of the air conditioner 4000 is 0x03b701, the EPC of its operation is 0x80, and its access rule allows control (set) and reference (get), "/0x03b701/0x80/set.txt" having the writable attribute and "/0x03b701/0x80/get.txt" having the readable attribute are made and stored into the storage part 3012.

When a plurality of ECHONET™- or Bluetooth®-ready devices are found, it may be possible to establish connections with respective devices, acquire respective property maps and make files for each of them.

Figure 16:
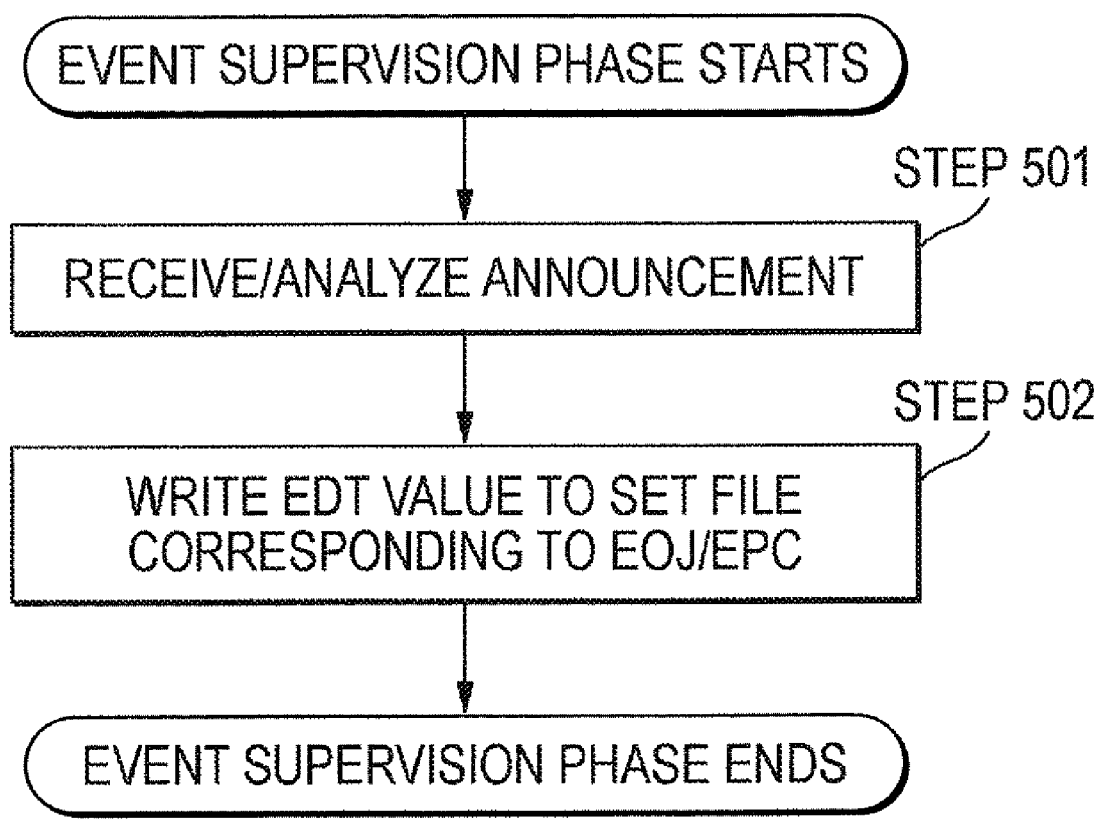
FIG. 16 is a flowchart showing an operation of the USB communication device at a supervision phase according to the second embodiment.

FIG. 16 is a flowchart showing the operation of the USB communication device 3000 at the supervision phase.

When the communication part 3003 receives an announcement from the air conditioner 4000, the protocol converter 3002 analyzes the content of the announcement (Step 501). The announcement includes an EOJ, an EPC and the value of the property indicated by the EPC.

The protocol converter 3002 writes the EDT value as the value of the property indicated by the EPC to a file having a name including the EOJ and EPC included in the announcement and "set" indicating that reference is allowed (Step 502).

In this way, the announcement from the ECHONET™-ready device is stored on the basis of EOJ and EPC.

Figure 17:
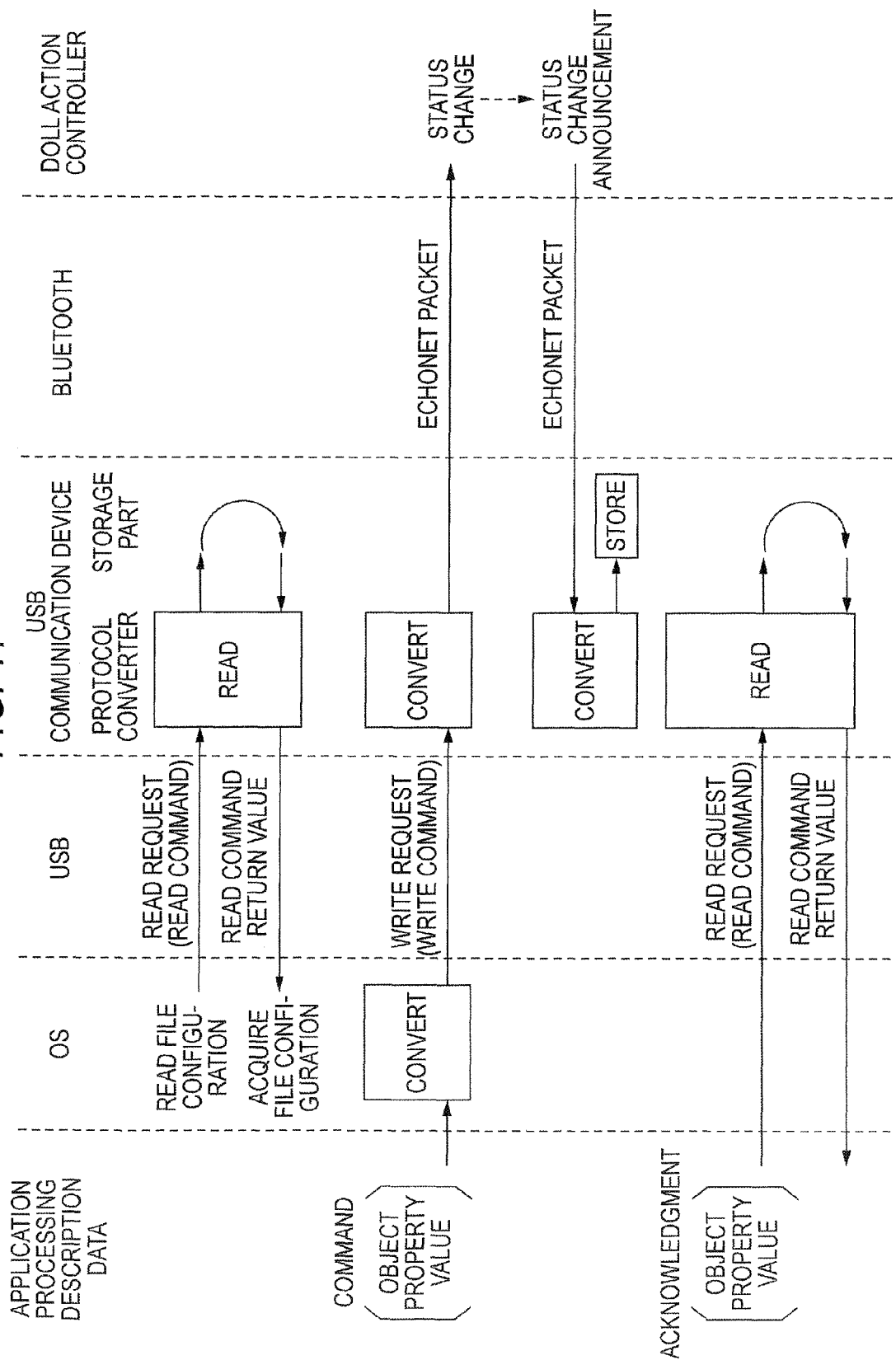
FIG. 17 shows a relationship between commands and values exchanged by devices at a command execution phase according to the second embodiment.

FIG. 17 shows the relationship between commands and values exchanged by the devices at the command execution phase.

The content playing apparatus 100 acquires a folder/file configuration such as a list of folder configurations and file names from the USB communication device 3000. The EOJ is a folder name so that the content playing apparatus 100 analyzes the acquired folder/file configuration to specify the ECHONET™-ready device from which the USB communication device 3000 has acquired a property map based on the class code in the EOJ.

Application processing description data includes, for example, a command to turn ON the operation of an object of an air conditioner. The application processing description interpreter 112 interprets the command and a command to request for writing 0x30 as an EDT value as data to turn ON the operation, on the file set.txt having writable attribute is transmitted to the USB communication device 3000 through the USBIF 106. The set.txt is included in a folder 0x80 as the EPC representing the operation property. The folder 0x80 is included in a folder 0x03b701 as the EOJ of the air conditioner 4000.

Receiving this write request, the USB communication device 3000 generates an ECHONET™ packet with EOJ=0x03b701, EPC=0x80, and EDT=0x30 and transmits the packet to the air conditioner 4000. In the second embodiment, the ECHONET™ packet corresponds to one of the operation requests.

This packet causes the air conditioner 4000 to turn on its operation.

When the value described in get.txt in the same folder as that of the destination file (set.txt) of the received write request is 0x30, the USB communication device 3000 may not generate the ECHONET™ packet since the operation of the air conditioner 4000 is already ON.

A change in the operation property status may be noticed to the USB communication device 3000 as an event when the air conditioner 4000 has changed from one of the operation ON status and operation OFF status to the other status.

As shown in FIG. 17, after the air conditioner 4000 has turned ON its operation, the content playing apparatus 100 transmits the read request of "/0x03b701/0x80/get.txt" to the USB communication device 3000. The protocol converter 3002 of the USB communication device 3000 accordingly reads "/0x03b701/0x80/get.txt" from the storage part 3012 and sends back the read value to the content playing apparatus 100. Such a read request may be made repeatedly in succession. For example, when the last update date/time of "/0x03b701/0x80/get.txt" is updated than the previous access, the repetition may be terminated.

The USB communication device 3000 that has received a read request of "/0x03b701/0x80/get.txt" may engage the air conditioner 4000 to transmit an ECHONET™ packet to acquire EDT with EOJ=0x03b701 and EPC=0x80. In this embodiment, the ECHONET™ packet corresponds to one of the status acquisition requests.

Figure 18:
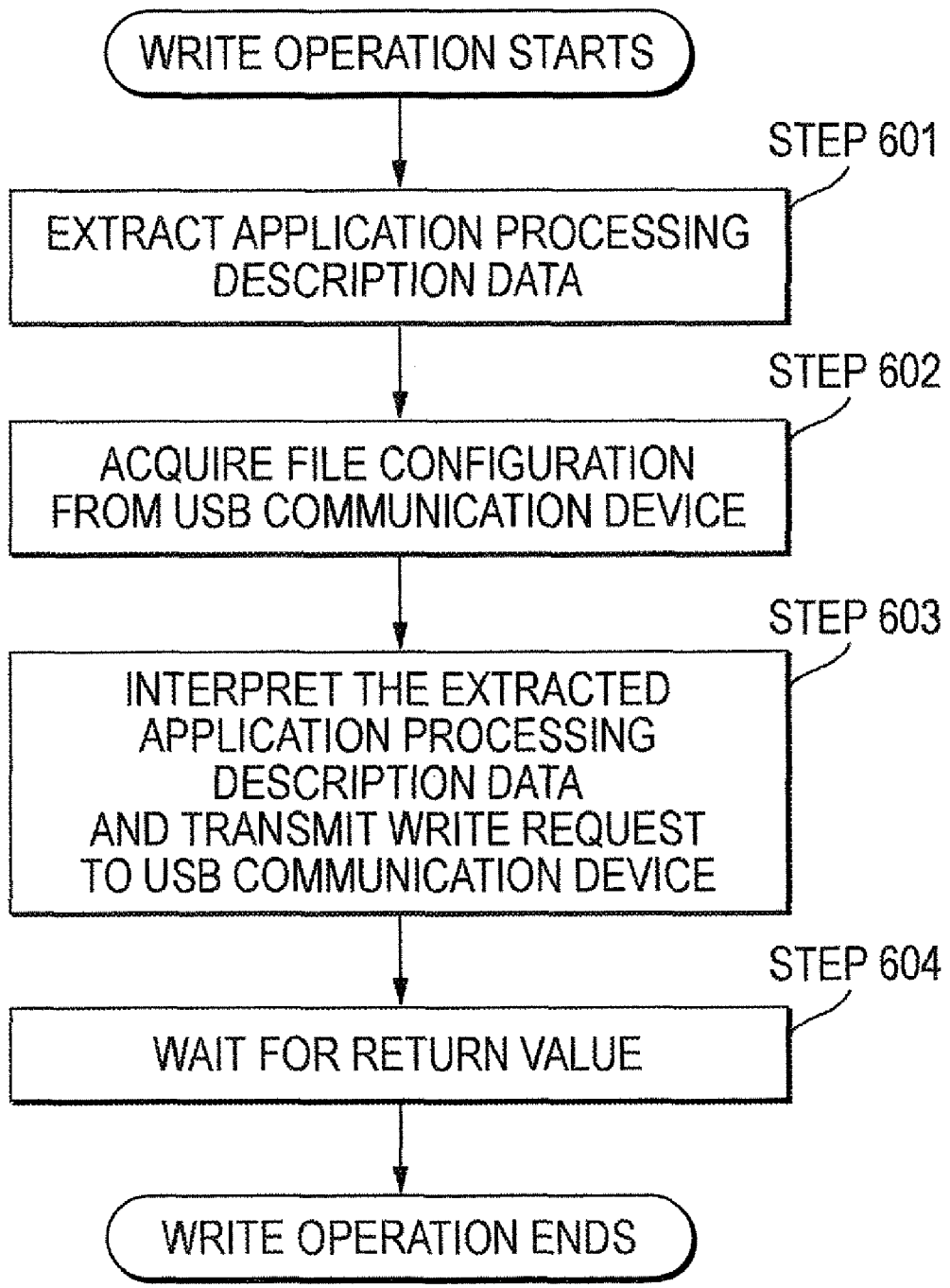
FIG. 18 is a flowchart showing an operation related to a write request of the content playing apparatus according to the second embodiment.

FIG. 18 is a flowchart showing the operation related to the write request of the content playing apparatus 100.

Acquiring content information from a content source, the application processing description interpreter 112 extracts therefrom application processing description data (Step 601).

Next, the application processing description interpreter 112 acquires a folder/file configuration from the USB communication device 3000 (Step 602). The application processing description interpreter 112 determines the class of the ECHONET™-ready device from which the USB communication device 3000 has acquired a property map from the folder/file configuration.

Next, the application processing description interpreter 112 interprets the extracted application processing description data, issues a write request including an EDT value and a file name to which it should be written, to a drive including a folder having a name including the class code of a target object of a command in the application processing description data (Step 603), and waits for a return value (Step 604). In this example, the application processing description data is a command for an object of an air conditioner, so that what is issued is a write request to a drive representing the USB communication device 3000 having a folder named EOJ of the air conditioner.

Figure 19:
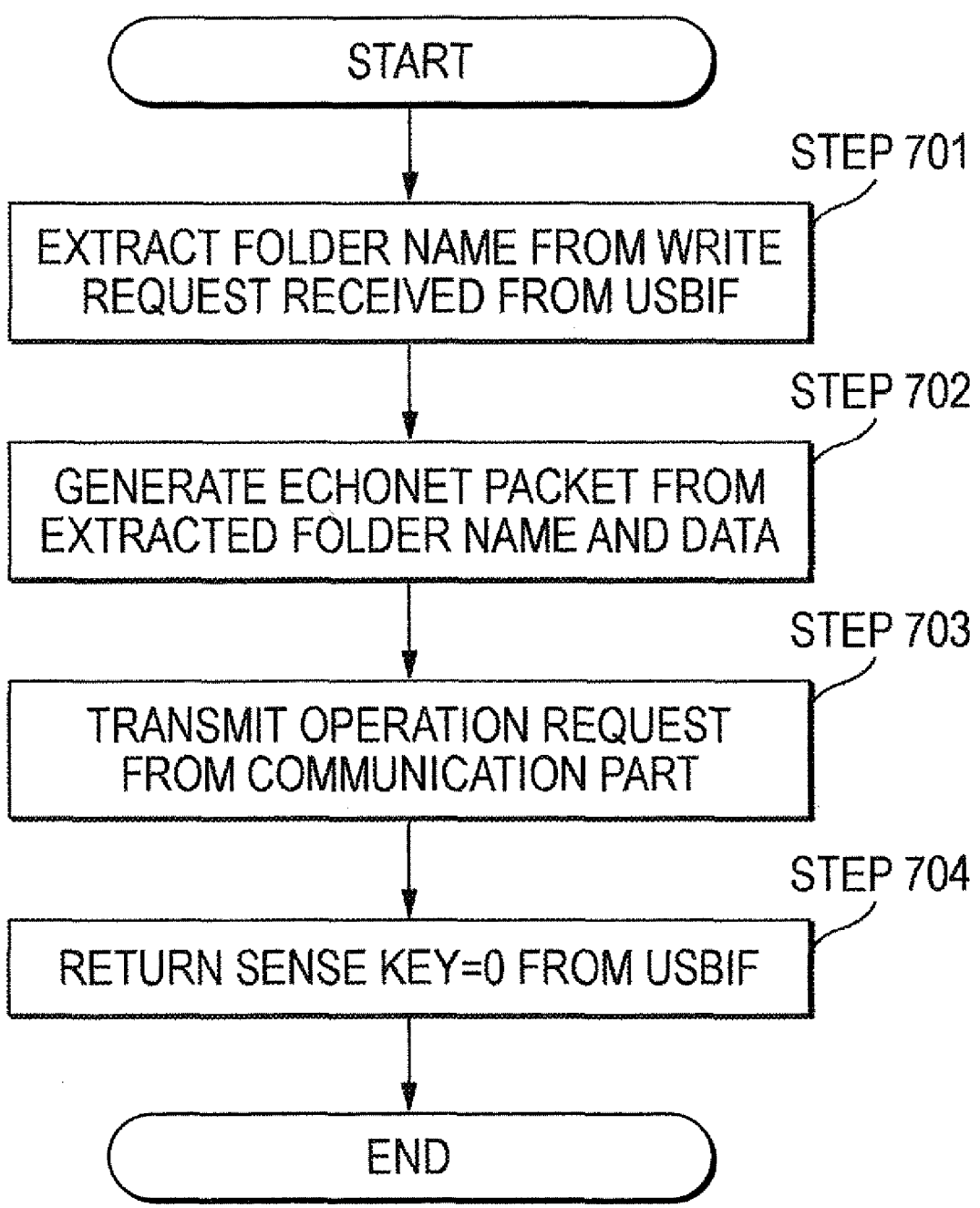
FIG. 19 is a flowchart showing an operation of the USB communication device according to the second embodiment.

FIG. 19 is a flowchart showing the operation of the USB communication device 3000 in FIG. 18.

Receiving the write request from the content playing apparatus 100, the protocol converter 3002 of the USB communication device 3000 extracts an EOJ and an EPC from the names of a destination file and its higher-rank folder (Step 701).

Next, the protocol converter 3002 generates an ECHONET™ packet from the extracted EOJ and EPC and the EDT as a write value included in the write request (Step 702).

Next, the protocol converter 3002 transmits the generated ECHONET™ packet to the communication part 3003 to cause the communication part 3003 to transmit the packet to the air conditioner 4000 (Step 703), and returns 0 as a value of SENSE KEY to the content playing apparatus 100 (Step 704).

While a controlled device is an ECHONET™-ready air conditioner in the second embodiment, the invention may be applied as necessary even when UPnP™ as a protocol for controlling other network devices is used for control.

The ECHONET™ uses a property map in order to investigate which type of control may be made on an ECHONET™ device. When an UPnP™ device is used as a control target, device information called DeviceDescription or ServiceDescription is used instead. While the ECHONET™ generates the file "/(EOJ)/(EPC)/(access rule).txt", a URL such as /upnp/foo/bar called control URL for identifying the control target may be used as a file name in the UPnP™ environment. While the information to be written into the file is EDT in the ECHONET™, an XML-format character string called a SOAP message used to control UPnP™ may be written into the file in the UPnP™ environment.

While only ECHONET™-ready devices may be controlled by way of the USB communication device 1000 or 3000 in the foregoing description, it is possible to configure the system so that both ECHONET™ devices and UPnP™ devices are controlled. In such a case, a specific file for control is dynamically generated in accordance with the property of a device to be connected. To be more specific, when the ECHONET™ device is connected to a controller device, a control file based on DeviceDescription is generated.

While the interface of the USB communication device to the content playing apparatus 100 is USB in the foregoing embodiments, any interface may be used as long as it behaves as a single storage device with respect to the content playing apparatus 100 and handles a write request or a read request issued by the content playing apparatus 100, for example, when File Transfer Profile of Bluetooth® is used.

According to the system of the embodiments thus configured, it may be possible to control various functions of network devices by using a storage operation feature generally included in a content playing apparatus. As a result, it may be possible to provide a "content operating in coordination with a network device".

The configuration illustrated in the embodiments of the invention is only exemplary and is not intended to exclude the other configurations. Another configuration is possible where part of the illustrated configuration is replaced with another configuration, part of the illustrated configuration is omitted, another feature or element is added to the illustrated configuration, or any combination of these variations is provided. Another configuration logically equivalent to the illustrated configuration, another configuration including a part logically equivalent to the illustrated configuration, or another configuration logically equivalent to the main part of the illustrated configuration is possible. Another configuration that attains the same or similar object as the illustrated configuration or another configuration that produces the same or similar effect as the illustrated configuration is also possible.

A combination of variations of the components illustrated in the embodiments of the invention may be implemented as required.

The embodiments of the invention include or encompass inventions related to various viewpoints, stages, concepts or categories, including an invention as an individual device, an invention of two or more devices related to each other, an invention as a whole system, and an invention of a method supporting these.

It is thus possible to extract an invention from the disclosure of invention in terms of the embodiments without being limited to the illustrated configuration.

The invention is not limited to the foregoing embodiments but various changes may be made thereto within the technical scope of the invention.

What is claimed is:

1. A communication apparatus configured to communicate with both a controller device and a control object device, the communication apparatus comprising:
    a first providing unit configured to provide file configuration information conforming to a file system format acceptable to the controller device;
    a receiving unit configured to receive an access request to a file included in the provided file configuration information, from the controller device;
    a converter configured to convert the access request from the controller device to control command information conforming to a predetermined protocol acceptable to the control object device;
    a second providing unit configured to provide the control command information to the control object device;
    a status requesting unit configured to send a status acquisition request to the control object device, which requests the status of the control object device; and
    a status request receiving unit configured to receive a status response from the control object device that indicates the status of the control object device.

2. The communication apparatus according to claim 1, wherein the communication apparatus communicates with the controller device in accordance with a USB mass storage class specification.

3. The communication apparatus according to claim 2, wherein the communication apparatus is a USB dongle.

4. The communication apparatus according to claim 1, wherein the access request to the file from the controller device includes a write request,
    wherein the converter converts the write request to an operation request to the control object device, and
    wherein the operation request is different in type of operation in accordance with a content included in the write request.

5. The communication apparatus according to claim 1, wherein the access request to the file from the controller device includes a write request or a read request, and
    wherein the converter converts the write request to an operation request to the control object device and converts the read request to a status acquisition request to the control object device.

6. The communication apparatus according to claim 1, wherein the access request to the file from the controller device includes a name of the file, and
    wherein the converter converts the access request to the control command information in accordance with the name of the file.

7. The communication apparatus according to claim 1, wherein the file system format is represented by a file and a folder including the file,
    wherein the access request to the file from the controller device includes a name of the folder and a name of the file, and
    wherein the converter converts the access request to the control command information in accordance with the name of the folder and the name of the file.

8. The communication apparatus according to claim 7, wherein the converter determines whether to generate a status acquisition request or an operation request to the control object device based on at least one of the name of the folder and the name of the file.

9. The communication apparatus according to claim 1, wherein the control object device is a doll that is controlled via the control command information that is sent wirelessly from the second providing unit of the communication apparatus.

10. The communication apparatus according to claim 9, wherein the control command information is sent by infrared communication.

11. The communication apparatus according to claim 10, wherein the doll includes a movement actuator that causes parts of the doll to move, and a talking actuator that causes lips of the doll to move.

12. The communication apparatus according to claim 11, wherein the status response indicates whether the movement actuator and the talking actuator are in operation or are stopped.

13. A method for controlling communication between a controller device and a control object device, the method comprising:

providing file configuration information conforming to a file system format acceptable to the controller device;

receiving an access request to a file included in the file configuration information from the controller device;

converting the access request to control command information conforming to a predetermined protocol acceptable to the control object device;

providing the control command information to the control object device; and sending a status acquisition request to the control object device, which requests the status of the control object device;

receiving a status response that indicates the status of the control object device when the status acquisition request is received.

14. A communication apparatus, comprising:

a first communication interface configured to communicate with a controller device using a first protocol that conforms to a USB mass storage class specification to provide file configuration information to the controller device, the file configuration information conforming to a file system format acceptable to the controller device and including a file to be accessed by the controller device with the first protocol;

a second communication interface configured to communicate with a control object device using a second protocol for transmitting control command information to the control object device to control the control object device;

a protocol converter configured to convert the file configuration information into the control command information;

a status requesting unit configured to send a status acquisition request to the control object device, which requests the status of the control object device; and a status request receiving unit configured to receive a status response from the control object device that indicates the status of the control object device.

* * * * *